3,008,871
INSECTICIDAL SELF-POLISHING WAX AND METHOD OF PREPARATION

Irving Feinberg, 204 N. Elm Ave., Sanford, Fla.
No Drawing. Filed Apr. 20, 1956, Ser. No. 579,437
15 Claims. (Cl. 167—30)

My invention relates to insecticidal self-polishing floor waxes and to methods of preparing insecticidal self-polishing waxes, and more particularly pertains to waxes, and methods of preparing waxes, containing residual insecticides which will be effective, upon application of the wax to a floor surface, for example, to kill insects, such as roaches, ants, water bugs, and the like, which walk across the waxed surface.

An object of my invention is to provide a self-polishing wax which will contain an insecticide which is not destroyed by the necessary alkalines in the wax preparation.

A more specific object of my invention is so to incorporate a residual insecticide in a self-polishing floor wax that the insecticide in the final product will remain chemically unchanged, even after relatively long storage periods, and that the emulsified solid matter in the preparation will remain in emulsion and, specifically, will not form or change into a hard or semi-hard gel or cake in the container after extended periods of storage under varying temperature conditions.

A further object of my invention is to prolong the effectiveness of residual insecticides when applied to a surface.

An additional object of my invention is to incorporate a residual insecticide in a wax coating preparation in a manner such that the final coating will have desired hardness and non-tacky characteristics.

Attempts have heretofore been made to incorporate insecticides in oil and wax polishes. Such efforts to incorporate insecticides in wax preparations have heretofore proved unsuccessful. The attempts have resulted in wax preparations in which the insecticides have been destroyed or rendered ineffective, in which the gloss, hardness, transparency, spreading, leveling, or water resistance qualities of the wax have been greatly impaired, or in which the emulsion would gel or solidify and no longer be in useful emulsified form.

More particularly, certain residual insecticides, for example, that commonly known as Lindane, of the type which possess desired insecticidal characteristics when dissolved in a liquid solvent for spraying, have been found to be destroyed when such insecticides have been added to alkaline emulsions. The insecticides when so added have, furthermore, adversely affected the emulsion. That is, when such insecticides are added to a self-polishing wax emulsion, the emulsion is weakened, and the solid wax particles originally dispersed in the vehicle collect to form a gel-like mass in the container, a mass which agitation will not return to a usable liquid phase. It seems likely that a by-product of the chemical reaction which destroys the insecticide in turn reacts with and destroys the soap film encompassing the wax particles, although some other action may occur to cause such weakening or breaking of the emulsion.

While some residual insecticides, such as those commonly known as Aldrin and Dieldrin, tend to some extent to resist destruction in alkaline media, these materials are, like Lindane, substantially water-insoluble solids. In order to incorporate such materials in a liquid emulsion, therefore, they would be first dissolved in a solvent such as benzene. However, such solvents are also solvents for the waxes or resins, or both, ordinarily included in emulsion wax preparations. The result of adding such solvents to the preparation is that the final wax film obtained is greatly softened, and has generally poor characteristics. To overcome this condition, a very much greater than normal percentage of hard waxes must be provided in the preparation, very considerably adding to the cost and presenting further problems in respect to spreading, leveling and anti-slip characteristics.

It has been found, furthermore, that the mere mixing of a residual insecticide substance in a floor wax emulsion preparation does not provide a satisfactory insecticidal coating composition in that, even if conditions are so controlled as to prevent destruction of the insecticidal substance in the product, the final coating has the insecticidal substance in the outer phase and, apparently, concentrated at the surface. The surface tension of the insecticide under these conditions is relatively low, permitting rapid evaporation, the high surface concentration increases likelihood of possibly dangerous contamination of foods or injury to infants or pets, and the exposed position of the insecticidal materials permits these materials to be rapidly worn or washed away in normal use. It is, accordingly, an important object of this invention to provide a surface coating which will provide insecticidal activity over an extended period, which will have a controlled, substantially constant surface activity as a contact insecticide, and which has the wearing qualities, protective properties, gloss and color characteristics, ease of application, anti-slip characteristics and other qualities and characteristics which may be desired in the particular application.

In accord with my invention, any one of the insecticides commonly known as Lindane, Aldrin and Dieldrin, among others, each of which is a water-insoluble solid, may be incorporated in a water emulsion self-polishing wax preparation without injury to the emulsion, without appreciable destruction of the insecticide even though the emulsion may be highly alkaline, without the use of solvents which would soften the final wax film, and in such manner that the final wax film, formed upon coating a surface with the emulsion and subsequent drying or setting, is effectively insecticidal for an extended period.

These results are obtained by dissolving the insecticide in one or more of the solid constituents of the emulsion while that constituent, or those constituents, is in a molten state, at an elevated temperature, preferably during preparation of the emulsion.

I have found that it is possible, using the method hereinafter set forth, successfully to combine in a wax emulsion such insecticides as Lindane (the gamma isomer of 1,2,3,4,5,6 hexachlorocyclohexane); Aldrin (1,2,3,4,10,10 hexachloro-1:4, 5:8 diendomethano-1,4,4$\alpha$,5,8,8$\alpha$ hexahydronaphthalene), Dieldrin (1,2,3,4,10,10 hexachloro-6,7 epoxy-1,4,4$\alpha$,5,6,7,8,8$\alpha$ octahydro-1,4,5,8 dimethanonaphthalene); DDT (p,p-dichlorodiphenyl trichloroethane); DDD or TDE (dichlorodiphenyl dichloroethane; tetrachloro diphenylethane); methoxychlor (2,2-bis(p-methoxyphenyl) 1,1,1-trichloroethane and other isomers and reaction products, and dimethoxy diphenyl trichloroethane and other isomers and reaction products), methoxychlor is a methoxy analog of DDT; dianisyl trichloroethane); toxaphene (chlorinated camphene; $C_{10}H_{10}Cl_8$); heptachlor (1,4,5,6,7,8,8-heptachloro - 3$\alpha$,4,7,7$\alpha$ - tetrahydro-4-7-methanoindene; $C_{10}H_5Cl_7$); perthane (1,1-dichloro-$\alpha,\alpha$-bis (p-ethyl-phenyl) ethane); isodrin (stereoisomer of Aldrin) (1,2,3,4,10,10-hexachloro - 1,4,4$\alpha$,5,8,8$\alpha$-hexahydro - 1,4,5,8 - endo-endo-dimethanonaphthalene); and Endrin (stereoisomer of dieldrin) (hexachloroepoxy-octahydro-endo, endo-dimethanonaphthalene). Each of the above insecticidal materials is generally a solid crystalline chlorinated hydrocarbon residual contact insecticidal material and insecticides of this general class are particularly suitable for use in this invention. The materials listed are generally effective against substantially all household pests, although certain of the materials may be more or less effective than others against one or several types of pests. Lindane, for example, is particularly suitable for use in a kitchen floor coating formulation in that it is highly effective against roaches, ants and flies. Some varieties of pests have developed substantial immunity to DDT, for example, whereby DDT, for this reason, may be less desirable in most instances than Lindane or some other materials of the list. Certain other chlorinated hydrocarbon solid residual insecticides also could be used as, for example, di(p-chlorophenoxy) methane ($C_{13}H_{10}O_2Cl_2$) which has specific effect on red spiders and mosquito larvae, but because of the specific limited variety of pests killed by this material, it would not be normally desirable unless accompanied by other insecticidal materials of the list.

Lindane, Aldrin, Dieldrin, DDT, DDD, methoxychlor, toxaphene, heptachlor, perthane, isodrin and endrin and other solid chlorinated hydrocarbon residual insecticides are substantially water-insoluble and, in accord with an important aspect of my invention, a solid chlorinated hydrocarbon residual contact insecticide material which is generally a crystalline solid at atmospheric or room temperatures is dissolved at an elevated temperature in a melted film-forming base or inner phase constituent of the final product prior to emulsification of this constituent and preferably prior to a time at which the final, necessarily relatively highly alkaline pH is established. It has been found that by following the method hereinafter explained in detail, a self-polishing wax preparation is produced which possesses long shelf life, excellent polishing properties, and effective insecticidal properties in use.

The word emulsion is commonly employed in the art to describe self-polishing wax preparations of the type comprising, at room temperatures, a dispersion of solid wax particles. This dispersion is ordinarily formed by mixing the wax with water or an aqueous medium at a temperature at or above the melting temperature of the wax to form an emulsion, wherein the dispersed phase is molten wax particles, and by then cooling finally to reach room temperature. Although the product when cool constitutes a dispersion of solid wax particles, such dispersions, in accord with common practice, are herein referred to as emulsions and are said to have a solid dispersed phase. The same nomenclature is adhered to herein to describe dispersions of solid particles which solid particles are of resin or of mixtures or solutions of resin and wax, and, in accord with this invention, wherein the solid particles comprise solid solutions of a wax or resin, or both, with an insecticide and with or without other substances in the solid solution.

The novel features which I believe to be characteristic of my invention are set forth with particularity in the appended claims. My invention itself, however, both as to its organization and method of operation, together with further objects and advantages thereof, may best be understood by reference to the following description.

A wax in accord with my invention may be manufactured with the use of standard jacketed kettles of the type ordinarily used in the manufacture of wax preparations. Such kettles may be supplied with steam, up to about 100 pounds' pressure, for example, for heating purposes, and alternatively with water for cooling purposes, the kettles may be formed of stainless steel or other materials, as desired and most of the kettles will necessarily be provided with an agitator. In the manufacture of 400 to 500 gallon batches of product, a 100 gallon kettle may be provided as a wax and resin melting container, having a paddle type agitator. Preferably immediately below this container is a kettle having a capacity of 500 gallons, or more, provided with a high speed propeller type of agitator. A 500 gallon kettle or tank should also be provided for heating water to the boiling point in quantities of about 300 gallons and a fourth tank or kettle, which may have a capacity of 60 gallons, should also be available for heating a few gallons of water, borax and caustic potash.

With such equipment, to make 2,000 gallons of a wax emulsion in accord with my invention, it is preferred to prepare four separate 400 gallon wax, resin, insecticide, water emulsion batches which are finally mixed with a 400 gallon outer phase resin and alkaline solution. In preparing one of the 400 gallon wax batches, 190 pounds of an oxidized microcrystalline petroleum wax, such as that identified as "Cardis No. 314," manufactured by Warwick Wax Company, Inc., 1010 44th Avenue, Long Island City, New York, may be deposited in the wax melting kettle. 100 pound steam is applied to the kettle jacket for about 10 minutes during which time the wax starts to melt, the melting temperature being between about 184 and 189° F. The paddle type agitator is then started at slow speed, and after about 20 minutes more the wax should be about one quarter melted. At this time 195½ pounds of resin is added, the resin having been broken into chips and lumps of a maximum size of about one pound each. A suitable resin is that sold by Durez Plastics and Chemicals, Incorporated, of Tonawanda, New York, and identified as "Durez No. 13560." This resin is an oil soluble, high melting point, low viscosity, phenol terpene thermoplastic resin in combination with oleic acid in the proportion of 81.8 percent resin to 18.2 percent oleic acid. The oleic acid in this resin serves to lower the melting point, and the resin melts in the presence of molten wax at customary emulsion wax melting temperatures. The paddle agitator is preferably operated at a slow speed as the wax and resin continue to melt, the agitator speed being approximately 35 r.p.m. By the end of approximately another half hour, the temperature of the wax, resin and oleic acid should have reached about 270° F. and they should be substantially completely melted. At this time the steam is shut off from the jacket, and cooling water is circulated therein, and at the same time the agitator speed may be approximately doubled. When the temperature of the mixture drops to 203° F., the cooling water flow is stopped, but the agitator continues in operation at about 70 r.p.m.

Into the mixture of resin, wax and oleic acid being agitated at 203° F. may now be added either an alkaline portion or the insecticide portion. It will be assumed that the alkaline portion is to be added first.

The alkaline portion comprises 30 pounds of morpholine, a liquid, at room temperature. The alkaline material selected should be a liquid at room temperature or, in any case a liquid at the mixing temperature of about 203° F. This liquid is merely poured into the kettle, while the agitator continues, and it will be found that the reaction between the oleic acid and the morpholine will increase the temperature to approximately 206° F. After approximately ten minutes of agitation, 21 pounds of chemical Lindane, which is of 99 percent or greater purity, and which comprises the insecticide portion, is added in its crystalline form and agitation continues for at least five minutes thereafter. During this time the temperature should be maintained, by steam or cooling water in the jacket as required, between 202 and 206° F. A lighter colored final film, and a clearer product, may be expected if the temperature is not permitted to increase at this time to as much as 210° F.

In the meantime, water will have been heated in the 500 gallon tank to the boiling point and a solution of about 7 gallons of water with 27 pounds of borax and 1 pound, 5 ounces, of potassium hydroxide (caustic potash) will have been heated in the 60 gallon kettle to 212° F. The 7 gallon borax and potash solution is now flowed or poured into the batch of resin and wax, the agitator being decreased in speed to about 50 r.p.m. for six minutes. This solution emulsifies in the wax and resin mixture.

About 290 gallons of water is now transferred from the 500 gallon water heating kettle into the final 500 gallon or larger mixing kettle, and its temperature maintained at between about 206 and 210° F., the 10" propeller type agitator being driven at high speed, such as 700 r.p.m. After the borax-potash solution is thoroughly emulsified in the wax, resin mixture, the steam is cut off of the final mixing kettle and the wax, resin, borax, Lindane, potash, morpholine mixture is dumped rapidly into the 290 gallons of water. The whole volume of mixture from the wax melting kettle should be transferred in about 20 seconds. The agitator continues to turn at 700 r.p.m. for approximately one minute after this dumping and then its speed is reduced to about 350 r.p.m. After the wax resin mixture has entered the final mixing tank, cooling water is supplied to the jacket. This cooling water may be economically drained into the 500 gallon water heating kettle, until the kettle contains about 300 gallons of water to be brought to 212° ready for mixing in the appropriate steps of production of the next batch.

When the temperature of the water, wax and resin emulsion in the final mixing kettle has been reduced to about 140° F., cold water is added to bring the total volume to 400 gallons, and when the temperature has been lowered to about 100° F. the emulsion may be pumped into a storage tank. Storage tanks of about 3,000 gallon capacity are suitable, and each such storage tank should be provided with an 18" propeller type agitator. Four or five such 400 gallon batches of emulsion may be supplied to one of the tanks, and after these batches have been so completed, a 400 or 500 gallon batch of an alkaline solution of a soluble resin is supplied to the storage tank for use in the outer phase of the wax emulsion to provide a product having superior spreading and leveling qualities.

If it is assumed that four 400 gallon batches of emulsion have been stored in a storage tank, a 400 gallon batch of such resin solution should be added. To prepare a 400 gallon batch of resin solution for this purpose a finely ground resin such as "Durez No. 15546" may be employed. 456 pounds of this resin are added to 300 gallons of water maintained at 180° F. in a kettle having an agitator operated at high speed. Immediately after introduction of the resin, 13.5 gallons of 28° Baumé aqua ammonia is added, and agitation is continued for about one hour or until the resin is completely dissolved meanwhile holding the temperature at 180° F. The solution may then be cooled and enough water is added to bring the total amount to 400 gallons. The pH of the 400 gallon solution should be adjusted to approximately 9 by the addition of aqua ammonia as necessary, and the alkalinity of the emulsion in the storage tank should also be adjusted to approximately pH 9 by the addition, as necessary, of aqua ammonia, preferably prior to the addition of the resin solution.

When the temperature of the resin solution is reduced to about 90° F., this 400 gallon batch of resin solution storage tank with the storage tank agitator in operation.

The alkali-soluble resin suggested above improves spreading, leveling and anti-skid properties of the final coating. Other materials, such as shellac or casein compounds, or other types of soluble resins, are known which may be substituted for the particular soluble resin herein specified, as desired. While the above description of the process specifically mentions a wax identified as "Cardis No. 314" as being suitable, it is to be understood that the mentioned wax is one of a large number of microcrystalline petroleum waxes recommended by manufacturers for use in emulsion wax preparations, and that other waxes of the types known to be suitable to the particular desired end use of the emulsion may be substituted. Similarly, while "Durez No. 13560" is mentioned as a suitable base resin, any of many other resins can be substituted therefor as desired. More particularly, the insecticidal gamma isomer of 1,2,3,4,5,6 hexachlorocyclohexane, commonly known as Lindane, and herein so identified, readily dissolves in a proportion of at least 30 percent by weight in each of the following resins which are of the class heretofore known and marketed for use as a base resin in wax emulsion preparations:

Usual trade designation:                          Type of wax
 "Durez 219"_____ Terpene phenolic.
 "Durez 225"_____ Terpene phenolic.
  (The two above resins are obtainable from the above mentioned Durez Plastics and Chemicals, Incorporated.)
 "Lewisol 20"_____ Maleic modified glycerol ester of rosin.
 "Lewisol 28"_____ Maleic modified glycerol ester of rosin.
  (The two above resins are products of Hercules Powder Co., Wilmington, Delaware.)
 "Shanco 320"_____ Modified phenolic.
  (The above resin is a product of William H. Scheel, Inc., Brooklyn, N. Y.)
 "Resin X-776"_____ Phenolic.
  (The above resin is a product of U. S. Industrial Chemicals, Inc., New York, N. Y.)
 "Piccolyte"_____ Hydrocarbon terpene.
 "Piccoumaron"_____ Paracoumarone-indene.
  (The two above resins are products of Pennsylvania Industrial Chemicals Corp., Clairton, Pa.)

Of these resins, only the paracoumarone-indene "Piccoumaron" is not particularly adapted for use in a wax emulsion, although its use for other purposes in accord with the principles of this invention may be indicated under appropriate circumstances. The list given is restricted primarily to resins particularly recommended for and appropriate to wax emulsion preparations, and a large number of other resins will be found to dissolve Lindane under conditions such as are outlined above, such conditions being modified if necessary in accord, for example, with the melting point of the particular resin selected.

It will be further apparent that, if the selected resin does not contain oleic acid, or a suitable substitute, an appropriate quantity of such soap forming acid should be added. It may be found that the melting temperature of the pure selected resin is sufficiently high to destroy the insecticide if the insecticide is added to resin which is heated to such melting temperature. In such cases, it is appropriate to mix the resin with oleic acid or the like at the necessary elevated temperature, thereby to lower the melting point, and thereafter, before adding the insecticide, to reduce the temperature of the molten mass to a temperature lower than the original melting point of the resin alone but above the new melting point of the oleic acid and resin as intermixed. The presence of molten wax may further serve to lower the melting point, as will be apparent to those skilled in the art from the above specific process description.

It will be seen that in the above process, the insecticide has been added and dissolved in the molten wax and resin mixture prior to emulsification of the wax and resin. Although the morpholine may be added before the insecticide, and although the proportion of morpholine may be such as would, over any extended period of time, cause destruction of the insecticide, it has been found that no serious destruction of the Lindane results during the very short time before emulsification, and solidification of the wax, resin particles in which the insecticide is dispersed or in solid solution, and in which the insecticide is, accordingly, protected from future destruction by the alkaline liquid phase.

The emulsion, at any time after admixture of the resin solution, may be fed from the storage tank into suitable cans, bottles or other containers for sale and eventual application to floors or other surfaces to be waxed.

If vacuum kettles are available for use in the above-described process, it will be apparent to those skilled in the art that substantially lower temperatures than those herein specified may be appropriate.

The self-polishing wax preparation produced in accord with the process and with the proportions of ingredients set forth above comprises approximately 13 percent by weight of solids, including the wax, base resin, oleic acid, insecticide, and alkali-soluble resin. When this product is spread out to coat a surface, the water will evaporate and leave the solids as a hard, highly water resistant, very high gloss, insecticidal coating. The material, as applied, has very good spreading and good leveling properties.

In each emulsified particle of base resin and petroleum wax in the product will be approximately 5 to 6% by weight of Lindane in solid solution in the solid particle. Each such particle is coated with a film of the soap formed by the oleic acid and morpholine. Since Lindane is destroyed, or substantially reduced in effectiveness, by contact with a solution having an alkaline pH greater than about 7½ or 8, the Lindane remains effective only because it is dissolved in the wax and resin, which apparently protect it, except at the surface of each particle, from the alkaline vehicle or medium of the emulsion. Furthermore, by dissolving the insecticide directly into the solid portion of the final product, while that portion is in a molten state, the necessity for a separate solvent for the insecticide is obviated. Such solvents otherwise have the effect of making the final wax coating tacky and much less hard, and usually interfere with the obtaining of other desired characteristics.

Tests have indicated that Lindane is soluble in the base resin hereinabove mentioned, this resin being a mixture of 18.2% oleic acid and 81.8% terpene phenolic, oil soluble, high melting point, low viscosity resin. Melting 12% by weight of Lindane crystals in such resin yields a clear amber hard resin upon cooling. The addition of 50% by weight of Lindane, however, results in the formation of Lindane crystals readily visible throughout the material after cooling. It may be assumed that up to 12% of Lindane, and probably substantially more, may be dissolved in the resin, and that the Lindane remains in solution even after cooling and hardening of the resin. Whether this is chemically a true solid solution is difficult to prove and is not believed of primary importance, in that a true solution is undoubtedly very closely approached. It will be noted that the 21 pounds of Lindane in the suggested process amounts to about 11% of 195½ pounds, the amount of base resin.

Similar tests with the other herein mentioned chlorinated hydrocarbon solid residual insecticides indicate that each is soluble in melted terpene phenolic resin and that each remains in solution upon cooling and solidification of the resin up to at least a proportion of 25 parts of insecticide to 75 parts of resin by weight, i.e. 25% by weight of insecticide. The insecticides have, furthermore, been found to dissolve readily in the maleic modified glycerol ester of rosin mentioned above, when molten, and to remain in solution upon cooling and solidification.

It is contemplated in this invention that the emulsion preparation and the final coating will be subjected in use to atmospheric temperatures, and, accordingly, the wax and resin should have melting points of not less than about 110° F. or 120° F. However, since the insecticidal materials employed may be heat sensitive, a resin should be chosen which has a melting point, in the presence of oleic acid or such other materials as may be added thereto in the melt, not higher than about 300° F. and preferably somewhat lower.

Whether or not some or most of the Lindane, in the exemplary process above outlined, goes into solution in the wax is difficult to determine, since Lindane crystal formation in the wax alone would not be readily recognizable. It is believed that, in the process first hereinabove outlined, a portion of the Lindane added to the molten wax and resin mixture goes into solution and thereafter remains in solution in the wax, and that another, probably greater, portion goes into solution in the resin. That the Lindane remains in solid solution in at least one, and probably both, of the solid wax and resin constituents is borne out by the fact that the Lindane is not destroyed in the presence of the highly alkaline liquid outer phase of the final emulsion.

Lindane supplied, in accord with my method, to a molten mass of either an oxidized microcrystalline petroleum wax or of terpene phenolic resin, or maleic modified glycerol ester of rosin, or hydrocarbon terpene resin, or paracoumarone-indene resin, or to a mixture of such wax and one such resin, apparently dissolves in the wax or in the resin or in both. When Lindane is melted with any one of these resins, and when the mixture has been permitted to cool and has been retained for extended periods at room temperature, or at household refrigerator temperatures, while the resin becomes transparent and brittle, the mixture of Lindane in the resin is so complete as to cause no visible change in the transparent clear translucent properties of the resin. It is believed that a true chemical solid solution results. When Lindane is melted with wax alone, no precipitation of Lindane crystals can be discovered upon cooling, and it is therefore believed probable that the Lindane is in true solution in the wax. It is assumed, therefore, that, in the above outlined method, part of the Lindane is dissolved in the resin and part in the wax, and that in the final product, the emulsion particles of resin and wax, in the solid state, comprise a solid solution of Lindane. In any event, the Lindane is so thoroughly mixed and dispersed in the wax and resin as to be substantially completely protected from the alkaline vehicle, whereby the Lindane is not destroyed and is effective in the wax surface coating produced when the emulsion is spread on a surface. When so spread, the soap film around each emulsion particle breaks down or is destroyed, the morpholine probably evaporating, to expose the insecticide in the particles to the legs of insects, and as particles are broken or worn away by abrasion, new portions of the coating are exposed at its surface.

It will be apparent from the above discussion that the suggested process can be modified by melting the base resin constitutent alone, dissolving the insecticide in the resin and thereafter adding the wax, the latter preferably in molten condition. It is also apparently possible to dissolve the insecticide in the molten wax alone before the addition of the base resin constituent. However, by dissolving the insecticide after the wax and resin have been thoroughly melted and mixed together as first described, the wax, resin mixture may be at a lower temperature at the time of adding the insecticide, and the insecticide is at no time thereafter subjected to the higher temperatures desired in the wax and resin melting and mixing step.

As explained, the step of adding morpholine to the molten mixture may occur before or after the addition of the Lindane or other insecticide, there being little or no apparent difference in result depending on the order of these steps.

An acceptable product may be prepared by the described process in which the morpholine proportion is as little as one-half as great as specified. In such case, additional amounts of other alkalines should be added. If the alkalinity of the final product is as low as about pH 7.5 or pH 8, it will be found that the emulsion is insufficiently stable for storage temperature and storage time conditions usually met in practice. Accordingly, it will be desired to raise the alkalinity to pH 8.5, or to as high as pH 9.5, as determined by the particular requirements of a given situation. While borax, potash and aqua ammonia are herein used, in addition to morpholine, to increase the alkalinity, other materials are known as substitutes and may be employed. It should be understood that the primary reason for establishing alkalinity of pH 7.5 or above is to provide a final product in the form of a stable emulsion and the liquid or outer phase of the product is preferably only sufficiently alkaline to insure stability of the emulsion throughout the prospective storage period and under the temperature conditions which may be encountered during storage.

As mentioned above, the final addition of an alkali-soluble resin, or its equivalent, is not essential but is preferred to improve leveling, spreading and anti-skid properties.

If desired, carnauba wax may be included in the emulsion product herein described, and the proportions of the waxes and resins may be appropriately altered. Thus if carnauba wax is substituted for a portion of the softer petroleum wax described, the proportion of base resin may be reduced.

Satisfactory floor wax emulsion products result from melting and mixing together, in parts by weight, 10 parts of microcrystalline petroleum wax, 9 parts of maleic modified glycerol ester of rosin ("Lewisol 28") and 2 parts of oleic acid at about 280° F., cooling to about 200° F. while continuing agitation, and adding and mixing from 0.5 to 1 part preferably, but not less than about 0.1 and not more than about 4 or 5 parts, of Lindane, or of Aldrin or Dieldrin or their stereoisomers, or methoxychlor, toxaphene, heptachlor, perthane or strobane. Following the addition of the solid insecticidal ingredient and the melting thereof, approximately 1.5 parts of morpholine is added and mixed, with sufficient cooling to prevent substantial rise in temperature. Water heated nearly to its boiling point is next mixed with the molten wax-resin mixture, preferably by introducing the mixture into the water with high speed agitation. Approximately 130 parts by weight of water may be employed to provide a readily spreadable thin emulsion, although for certain applications more or less water may be employed as desired.

Other selected materials, such as soluble outer phase resins, borax, potassium hydroxide, and ammonia, and soluble, inner phase resins, carnauba or paraffin wax, synthetic rubber materials, shellac or casein compounds and the like may be added as desired to adjust the pH of the emulsion, to add anti-slip or other characteristics to the coating and for other known purposes. In order to prevent breaking of the wax-resin floor coating emulsion during storage periods, it has been found necessary to maintain alkalinity of the emulsion, which, for example, should be adjusted to be between about pH 7 and pH 9.

The other resins of the list given hereinabove are adapted to similar processes for producing an insecticidal coating emulsion preparation in accord with the invention, embodying a solid, contact-type chlorinated hydrocarbon residual insecticidal material. As is known in the art, it may be desirable, in order to increase the hardness of the film or for other purposes, to add wax, resin, rubber-like materials and other substances known to impart desirable properties in wax-resin emulsion coating preparations.

Insecticidal floor waxes made in accord with the described preferred method of this invention, have been subjected to laboratory tests to determine the effectiveness, in killing roaches, possessed by the wax and possessed by a spray of the same insecticide. A wax product prepared in accord with the process first described herein but containing 1% of Lindane insecticide, and having an alkaline outer phase of pH 9, was spread upon a test surface and an oil (deodorized kerosene or "deobase") solution liquid spray containing 1% of the same insecticide was applied to a similar test surface. Other pairs of test surfaces were coated respectively with wax containing 0.5% insecticide and a spray containing 0.5% insecticide and with the wax preparation containing 0.3% and a spray containing 0.3% insecticide. The test results showed approximately equal kills of roaches exposed to the surfaces treated with the respective 0.5% products. The kill obtained from the panel sprayed with 1% spray was slightly greater than that from the panel coated with the 1% insecticidal wax, but the 0.3% insecticidal wax coated panel showed greater kill than the panel sprayed with 0.3% spray.

Chemists thoroughly familiar with Lindane and its properties have further tested the product prepared as suggested hereinabove, wherein the percentage of Lindane added was 0.5% by weight of the total weight of the product. Certain of these tests were made to determine the amount of Lindane in the product by chemical tests.

In these chemical tests, the decomposition of Lindane was detected by measuring the percentage of ionic chlorine in the emulsion product without insecticide and in the product in which 0.5% Lindane had been incorporated. The amounts of chlorine were determined in these test samples by the metallic sodium-isopropyl alcohol method, the resulting chlorides being titrated by the Caldwell-Moyer modification of the Volhard method.

Results of these tests indicated that the sample when originally tested contained 0.488% of Lindane, and, after a two week aging period, the sample contained 0.468% of Lindane.

These chemical tests, therefore, show that over a period of weeks the breakdown of Lindane is very much less than would be expected in a product having an alkalinity of pH 9. They further demonstrate that the breakdown is at a rate slow enough to be unimportant in a commercial product.

The chemical tests not only accord with the theory hereinabove advanced and with practical experience with the product, but also they are supported by biological tests.

In biological tests, with test traps originally coated with the wax emulsion prepared with 0.5% Lindane and left open to the air for 13 days, test kills of 85% of introduced adult male German roaches resulted from three hour exposures of the roaches to the film. No kills resulted in test traps originally coated with the emulsion from which Lindane had been omitted. After 19 days, a trap which had been left closed after coating gave 100% kill after a three hour exposure of roaches.

In further tests, it was demonstrated that evaporation of Lindane from a wax emulsion coating prepared as suggested was at a much slower rate than from a coating of Lindane alone.

In these tests, two Mason jars were internally coated, one with an acetone solution of Lindane to deposit, upon evaporation of the acetone, 0.14 mg. of Lindane per square inch, and the other with a sufficient amount of the emulsion, prepared as herein described, to leave a coating containing 0.14 mg. per square inch of Lindane, assuming no breakdown of the Lindane in the emulsion after the original addition of 0.5% of this ingredient. A separate clean jar was placed mouth to mouth with each of the two prepared jars, 25 test German roaches having been added to each jar, a screen was placed between the mouths of the sets of jars to permit circulation of air and vapors from the coated to the uncoated jar of each set and to prevent the roaches from moving from one to the other jar. Within 4 hours, all of the roaches in both of the coated jars were dead and 96% of the roaches in the uncoated jar connected to the one coated with Lindane alone had been killed by the fumigant contact, whereas none of the roaches in the uncoated jar connected to the one coated with the Lindane-containing wax coating had been killed by fumigation. After three days, only 48% of the roaches in the last mentioned uncoated jar had been killed by Lindane fumes given off from the wax coating, while the 96% fumigant kill in the uncoated jar of the first set had, of course, increased to 100%.

It will be apparent from these tests that the rate of evaporation of Lindane is greatly retarded by its incorporation into solids, such as wax and resin, in accord with this invention, thus considerably and desirably prolonging the residual effects of the insecticide.

While some of the above tests indicate that after 19 days' exposure to air of a coating in accord with this invention the contact insecticidal action is rather slow, it is believed that the normal abrasion usually experienced by a wax coating would tend substantially to alter this effect as a result of the wearing away of surface portions from which evaporation of Lindane might have occurred and the uncovering of underlying wax particles or layers still relatively strongly insecticidal. Practical results, under less exact control than the laboratory tests described, substantiate this belief.

All of the tests hereinabove reported were made in government or commercial laboratories not connected with applicant or any business associate of applicant.

While the discussion above relates primarily to Lindane, other solid contact-type, residually insecticidal chlorinated hydrocarbon materials, such as those specifically mentioned above, may be used in place of Lindane, and more than one such material may be included if desired. The first above outlined process of manufacture would, in such case, be modified only by the substitution of a like or comparable amount of another such insecticide for the 21 pounds of Lindane per 500 gallons of emulsion. It will be understood that the percentage of insecticide in the product represented by this weight may be varied between relatively wide limits. Thus, while it is suggested that 4% by weight of the solids may be the preferred proportion of insecticide, the film produced by the product containing about 2% of Lindane by weight of the total solids has been found by test to exhibit effective roach killing power. If desired, the percentage of insecticide may be increased above 4% by weight of total solids. Since the particular insecticidal material employed may be more or less effective than Lindane, the percentage of the selected insecticide may be increased or decreased accordingly. The proportion of Lindane in the process described, being about 84 pounds of Lindane to 2,000 gallons of total emulsion product, is about 0.5% by weight of the final product, and the suggested range is between about 0.3% to about 1.0% of the final product, although these ranges obviously can be extended if desired. It seems likely that a substantial destruction of Lindane would occur if the percentage were raised to substantially more than about 40% of the total solids, in that such amounts of Lindane might more than saturate the wax and resin and some of the Lindane would not be dissolved but would be open to attack and destruction by the alkaline liquid phase of the emulsion. The cost of Lindane tends to impose economic limits at about the range where Lindane comprises 5% to 10% of total solids, at the present time.

Lindane has been approved by the U.S. Department of Agriculture as harmless to human beings and animals in the relatively small quantities suggested in this application.

This invention, accordingly, relates to the incorporation of a safe residual insecticide, Lindane, in an emulsion wax preparation, in a manner such that the insecticide is not destroyed and does not require the incorporation of a wax-softening solvent, and further relates to the incorporation of other solid insecticides, which may be more resistant to destruction by alkaline solutions, in a manner such that no liquid solvent need be employed which would adversely affect the final wax film. Accordingly, while I have described only certain preferred embodiments of my invention by way of illustration, many modifications will occur to those skilled in the art, and I therefore wish to have it understood that I intend, in the appended claims, to cover all such modifications as fall within the true spirit and scope of my invention.

This application is a continuation-in-part of my copending and now abandoned application Serial No. 304,209, filed August 13, 1952, and entitled Insecticidal Self-Polishing Wax and Method of Preparation, which said application was a continuation-in-part copending with my earlier and now abandoned application Serial No. 60,819, filed November 18, 1948, and entitled Insecticidal Polishing Compound.

What I claim as new and desire to secure by Letters Patent of the United States is:

1. The process of preparing a residually insecticidal self-polishing floor wax or the like emulsion product which comprises the steps of: melting and mixing a quantity of a microcrystalline petroleum wax with a quantity of a soap-forming acid and a quantity of a high melting point resin selected from the group consisting of terpene phenolic resin and maleic modified glycerol ester of rosin at a temperature above 212° F.; cooling said molten mixture to slightly less than 212° F.; adding a quantity of a liquid soap-forming alkaline material to react with said acid to form a soap and a quantity of a substantially water-insoluble solid residual contact type chlorinated hydrocarbon insecticidal substance, and agitating the resultant batch of materials in the absence of water while maintaining a temperature of slightly less than 212° F.; and thereafter mixing said batch with hot water to form an emulsion having said wax, resin and insecticide in dispersed phase and adjusting the alkalinity of the outer liquid phase of the emulsion to result in a product of an alkalinity of between substantially pH 7.5 and pH 9.5.

2. The process of preparing a residually insecticidal self-polishing floor wax or the like emulsion product which comprises the steps of: melting and mixing a quantity of a microcrystalline petroleum wax with a quantity of a soap-forming acid and a quantity of a high melting point resin selected from the group consisting of terpene phenolic resin, and maleic modified glycerol ester of rosin at a temperature above 212° F.; cooling said molten mixture to slightly less than 212° F.; adding a quantity of a soap-forming alkaline material to react with said acid to form a soap and a quantity of a water-insoluble residual insecticide selected from the group consisting of the gamma isomer of 1,2,3,4,5,6 hexachlorocyclohexane; 1,2,3,4,10,10 hexachloro-1:4, 5:8 diendomethano-1,4,4α, 5,8,8α hexahydronaphthalene; 1,2,3,4,10,10 hexachloro-6,7 epoxy-1,4,4α,5,6,7,8,8α octahydro-1,4,5,8 dimethanonaphthalene; p,p-dichlorodiphenyl trichloroethane; dichlorodiphenyl dichloroethane 2,2-bis(p-methoxyphenyl) 1,1,1-trichloroethane and isomers thereof; chlorinated camphene; 1,4,5,6,7,8,8 - heptachloro - 3α,4,7,7α - tetrahydro-4-7-methanoindene ($C_{10}H_5Cl_7$); 1,1-dichloro-α,α-bis (p-ethyl-phenyl) ethane; 1,2,3,4,10,10-hexachloro-1, 4,4α,5,8,8α - hexahydro - 1,4,5,8 - endo-endo-dimethanonaphthalene; hexachloroepoxyoctahydro - endo, endo-dimethanonaphthalene; and di(p-chlorophenoxy) methane, and mixing the resultant batch with water.

3. The process of claim 2 wherein said soap-forming alkaline material is morpholine and wherein said soap-forming acid is oleic acid.

4. The process of preparing a residually insecticidal self-polishing wax product which comprises the steps of melting together a quantity of a wax which is solid at room temperature, a quantity of a resin selected from the group consisting of phenol terpene resin and maleic modified glycerol ester of rosin, a quantity of an organic acid and a quantity of an alkali, and a quantity of a solid, substantially water-insoluble residual insecticide selected from the group consisting of the gamma isomer of 1,2,3, 4,5,6 hexachlorocyclohexane; 1,2,3,4,10,10 hexachloro-1:4, 5:8 diendomethano-1,4,4α,5,8,8α hexahydronaphthalene; 1,2,3,4,10,10 hexachloro-6,7 epoxy-1,4,4α,5,6,7, 8,8α octahydro-1,4,5,8 dimethanonaphthalene; p,p-dichlorodiphenyl trichloroethane; dichlorodiphenyl dichloroethane; 2,2-bis(p-methoxyphenyl) 1,1,1-trichloroethane and isomers thereof; chlorinated camphene; 1,4, 5,6,7,8,8-heptachloro-3α,4,7,7α - tetrahydro-4-7-methanoindene ($C_{10}H_5Cl_7$); 1,1-dichloro-α,α-bis (p-ethyl-phenyl) ethane; 1,2,3,4,10,10-hexachloro-1,4,4α,5,8,8α-hexohydro- 1,4,5,8 - endo-endo - dimethanonaphthalene; hexachloroepoxyoctahydro-endo; endo-dimethanonaphthalene; and di(p-chlorophenoxy) methane, thereafter mixing the molten batch so formed with water at an elevated temperature and agitating to form an emulsion having said wax and resin in dispersed phase, and thereafter cooling to form an aqueous suspension of particles of said wax and resin, said particles having said insecticide in solid solution therein, and adjusting the acid-alkaline balance of the aqueous continuous phase to have a pH number of between substantially 7.5 and 9.5 thereby to provide storage stability of the resulting suspension at atmospheric temperatures, the quantity of said insecticide being proportioned to be between about 0.2 and 5.0% by weight of the finished product.

5. The process of claim 4 wherein said resin is phenol terpene resin and said insecticide is 1,2,3,4,10,10 hexachloro-1:4,4:8 diendomethano-1,4,4α,5,8,8α hexahydronaphthalene.

6. The process of claim 4 wherein said resin is phenol terpene resin and said insecticide is 1,2,3,4,10,10 hexachloro-6,7 epoxy-1,4,4α,5,6,7,8,8α octahydro-1,4,5,8 dimethanonaphthalene.

7. The process of claim 4 wherein said resin is phenol terpene resin and said insecticide is the gamma isomer of 1,2,3,4,5,6 hexachlorocyclohexane.

8. A stable residually insecticidal aqueous suspension wherein the dispersed phase comprises solid film-forming particles of an oxidized microcrystalline petroleum wax and a phenol terpene resin, said particles having in intimate admixture therein a substantially water-insoluble solid chlorinated hydrocarbon residual contact insecticide, said aqueous suspension including an emulsifying soap formed from water soluble alkali and acid materials introduced thereinto.

9. A stable residually insecticidal aqueous suspension wherein the aqueous phase has an alkalinity of between substantially pH 8–pH 9 and wherein the dispersed phase comprises solid film-forming particles of a wax and a terpene phenolic resin, said particles having in intimate admixture therein a solid substantially water-insoluble chlorinated hydrocarbon residual contact insecticide which is unstable in an alkaline medium.

10. A residually insecticidal self-polishing wax product comprising an aqueous suspension of solid coat-forming particles having as constituents a wax which is solid at room temperature and a resin selected from the group consisting of phenol terpene resin and maleic modified glycerol ester of rosin, and a solid substantially water-insoluble chlorinated hydrocarbon residual contact insecticide in intimate admixture in said constituents of said particles.

11. A product in accord with claim 10 characterized by an alkalinity of the aqueous medium of at least about pH 7.5.

12. A residually insecticidal self-polishing wax aqueous suspension product comprising dispersed particles of solid constituents in an alkaline aqueous medium, said product being characterized by said particles comprising a mixture of resin and wax solids, said resin being selected from the group consisting of terpene phenolic resin and maleic modified glycerol ester of rosin, and said solids carrying a substantially water-insoluble solid chlorinated hydrocarbon residual contact insecticide in solid solution therein.

13. A liquid coating composition consisting of an alkaline aqueous suspension of between substantially pH 8–pH 9 of which the dispersed phase comprises solid particles of wax and resin, said resin being selected from the group consisting of phenol terpene resin and maleic modified glycerol ester of rosin, said particles having in intimate admixture therein a solid, substantially water-insoluble chlorinated hydrocarbon residual contact insecticide material.

14. In a process for preparing an aqueous suspension coating product, the step of dissolving a normally solid residual insecticide selected from the group consisting of the gamma isomer of 1,2,3,4,5,6 hexachlorocyclohexane; 1,2,3,4,10,10 hexachloro-1:4, 5:8 diendomethano-1,4,4α, 5,8,8α hexahydronaphthalene; 1,2,3,4,10,10 hexachloro-6,7 epoxy-1,4,4α,5,6,7,8,8α octahydro-1,4,5,8 dimethanonaphthalene; p,p-dichlorodiphenyl trichloroethane; dichlorodiphenyl dichloroethane 2,2-bis(p-methoxyphenyl) 1,1,1-trichloroethane and isomers thereof; chlorinated camphene; 1,4,5,6,7,8,8-heptachloro-3α,4,7,7α-tetrahydro-4-7-methanoindene ($C_{10}H_5Cl_7$); 1,1-dichloro-α,α-bis (p-ethyl-phenyl) ethane; 1,2,3,4,10,10-hexachloro-1,4,4α,5, 8,8α - hexahydro - 1,4,5,8 - endo - endo - dimethanonaphthalene; hexachloroepoxyoctahydro-endo; endo-dimethanonaphthalene; and di(p-chlorophenoxy) methane, in a molten non-aqueous mass of normally solid coat-forming wax and resin materials, wherein said resin material is selected from the group consisting of phenol terpene resin and maleic modified glycerol ester of rosin.

15. A residually insecticidal self-polishing wax aqueous suspension product comprising dispersed particles of solid constituents in an alkaline aqueous medium, said particles comprising a mixture of resin and wax solids, said resin being selected from the group consisting of phenol terpene resin and maleic modified glycerol ester of rosin, and said solids carrying a substantially water-insoluble solid, alkaline-sensitive, chlorinated hydrocarbon residual contact insecticide in intimate admixture therein.

References Cited in the file of this patent

UNITED STATES PATENTS

| | | |
|---|---|---|
| 1,986,388 | Calcott | Jan. 1, 1935 |
| 2,071,027 | Dacus | Feb. 16, 1937 |
| 2,374,414 | Cartwright | Apr. 24, 1945 |
| 2,482,070 | Schoenholz et al. | Sept. 13, 1949 |
| 2,483,701 | Hawley et al. | Oct. 4, 1949 |
| 2,519,190 | Hyman | Aug. 15, 1950 |
| 2,546,328 | Arabian | Mar. 27, 1951 |
| 2,687,964 | Kennedy | Aug. 31, 1954 |

FOREIGN PATENTS

| | | |
|---|---|---|
| 108,087 | Australia | July 22, 1938 |
| 985,549 | France | July 19, 1951 |
| 275,652 | Great Britain | Oct. 20, 1927 |
| 623,701 | Great Britain | May 20, 1949 |
| 69,409 | Holland | Feb. 15, 1952 |

OTHER REFERENCES

"Soap and Sanitary Chemicals," pages 133, 135, 137 and 139, March 1947.

Vallance: Manufacturing Chemist, pp. 161–166, April 1947.

The Van Nostrand Chemist's Dictionary, p. 19, D. Van Nostrand (1953).

Caspari-Kelly: Treatise on Pharmacy, pages 288–289, 7th ed., Lea and Febriger, N.Y.

UNITED STATES PATENT OFFICE
CERTIFICATE OF CORRECTION

Patent No. 3,008,871                 November 14, 1961

Irving Feinberg

It is hereby certified that error appears in the above numbered patent requiring correction and that the said Letters Patent should read as corrected below.

Column 5, line 54, after "resin solution" insert -- should be added to the 1,600 gallons of emulsion in the --.

Signed and sealed this 10th day of April 1962.

(SEAL)
Attest:

ERNEST W. SWIDER

Attesting Officer

DAVID L. LADD

Commissioner of Patents